(12) United States Patent
Yalavarty et al.

(10) Patent No.: US 9,325,650 B2
(45) Date of Patent: Apr. 26, 2016

(54) VEHICLE TELEMATICS DATA EXCHANGE

(71) Applicant: Ford Global Technologies, LLC, Dearborn, MI (US)

(72) Inventors: Praveen Yalavarty, Novi, MI (US); John Thomas Ellis, Orland Park, IL (US)

(73) Assignee: Ford Global Technologies, LLC, Dearborn, MI (US)

( * ) Notice: Subject to any disclaimer, the term of this patent is extended or adjusted under 35 U.S.C. 154(b) by 135 days.

(21) Appl. No.: 14/243,200

(22) Filed: Apr. 2, 2014

(65) Prior Publication Data

US 2015/0288636 A1    Oct. 8, 2015

(51) Int. Cl.
*H04L 12/58* (2006.01)

(52) U.S. Cl.
CPC ..................... *H04L 51/16* (2013.01)

(58) Field of Classification Search
CPC ............................ H04W 4/046; H04W 76/007
USPC ............... 709/204, 205, 206, 219; 455/404.2, 455/426.1, 466
See application file for complete search history.

(56) References Cited

U.S. PATENT DOCUMENTS

| | | | |
|---|---|---|---|
| 5,155,847 A | 10/1992 | Kirouac et al. | |
| 6,035,423 A | 3/2000 | Hodges et al. | |
| 6,359,570 B1 | 3/2002 | Adcox et al. | |
| 6,694,248 B2 | 2/2004 | Smith et al. | |
| 6,853,910 B1 | 2/2005 | Oesterling et al. | |
| 7,055,149 B2 | 5/2006 | Birkholz et al. | |
| 7,092,803 B2 | 8/2006 | Kapolka et al. | |
| 7,171,661 B1 | 1/2007 | Pinera et al. | |
| 7,209,859 B2 | 4/2007 | Zeif | |
| 7,366,589 B2 | 4/2008 | Habermas | |
| 7,506,309 B2 | 3/2009 | Schaefer | |
| 7,512,941 B2 | 3/2009 | Pan et al. | |
| 7,672,756 B2* | 3/2010 | Breed ................... | G07C 5/008 701/1 |
| 7,822,775 B2 | 10/2010 | Langer | |
| 7,886,180 B2 | 2/2011 | Jin et al. | |
| 7,904,569 B1 | 3/2011 | Gelvin et al. | |
| 7,937,075 B2 | 5/2011 | Zellner | |
| 8,326,486 B2 | 12/2012 | Moinzadeh et al. | |
| 8,370,254 B1 | 2/2013 | Hopkins, III et al. | |
| 8,416,067 B2 | 4/2013 | Davidson et al. | |
| 8,427,979 B1 | 4/2013 | Wang | |
| 8,452,465 B1 | 5/2013 | Sinha et al. | |
| 8,458,315 B2 | 6/2013 | Miche et al. | |
| 8,473,938 B1 | 6/2013 | Feeser | |
| 8,494,449 B2 | 7/2013 | Witkowski et al. | |
| 8,498,771 B2 | 7/2013 | Dwan et al. | |

(Continued)

OTHER PUBLICATIONS

"Diagnosis in Automative Systems: A Survey"—Lanigan et al, Carnegie Mellon Univ., Jun. 2011 http://pdl.cmu.edu/PDL-FTP/ProblemDiagnosis/CMU-PDL-11-110.pdf.*

*Primary Examiner* — Randy Scott
(74) *Attorney, Agent, or Firm* — Jennifer M. Stec; Brooks Kushman P.C.

(57) ABSTRACT

A system may include a message publisher and a message recipient. The message publisher may be configured to identify a message to be published to a topic of a topic tree maintained by a message broker, the topic being associated with a type of the message identified to be published and an intended recipient of the message; pack data elements into the message according to a name/value pair message schema of the system; and publish the message via the message broker to the topic.

20 Claims, 7 Drawing Sheets

(56) References Cited

U.S. PATENT DOCUMENTS

| | | |
|---|---|---|
| 8,561,054 B2 | 10/2013 | Smirnov et al. |
| 8,918,231 B2 | 12/2014 | Rovik |
| 9,075,686 B2 | 7/2015 | Alrabady et al. |
| 2002/0120394 A1 | 8/2002 | Rayne |
| 2002/0150050 A1 | 10/2002 | Nathanson |
| 2002/0165962 A1 | 11/2002 | Alvarez et al. |
| 2004/0010358 A1 | 1/2004 | Oesterling et al. |
| 2004/0034624 A1 | 2/2004 | Deh-Lee et al. |
| 2004/0064385 A1 | 4/2004 | Tamaki |
| 2004/0117851 A1 | 6/2004 | Karaoguz et al. |
| 2004/0168169 A1 | 8/2004 | Ebro et al. |
| 2005/0010458 A1 | 1/2005 | Holloway et al. |
| 2005/0055687 A1 | 3/2005 | Mayer |
| 2005/0090941 A1 | 4/2005 | Stefan et al. |
| 2005/0125261 A1 | 6/2005 | Adegan |
| 2005/0144616 A1 | 6/2005 | Hammond et al. |
| 2005/0187668 A1 | 8/2005 | Baumgarte |
| 2005/0187682 A1 | 8/2005 | Gault et al. |
| 2005/0216902 A1 | 9/2005 | Schaefer |
| 2005/0256614 A1 | 11/2005 | Habermas |
| 2005/0262499 A1 | 11/2005 | Read |
| 2006/0047381 A1 | 3/2006 | Nguyen |
| 2006/0047415 A1 | 3/2006 | Groskreutz et al. |
| 2006/0047666 A1 | 3/2006 | Bedi et al. |
| 2006/0141997 A1 | 6/2006 | Amiens |
| 2006/0155439 A1 | 7/2006 | Slawinski et al. |
| 2006/0258377 A1 | 11/2006 | Economos et al. |
| 2008/0102854 A1 | 5/2008 | Yi et al. |
| 2008/0140278 A1 | 6/2008 | Breed |
| 2009/0064123 A1 | 3/2009 | Ramesh et al. |
| 2009/0088141 A1 | 4/2009 | Suurmeyer et al. |
| 2009/0119657 A1 | 5/2009 | Link, II |
| 2009/0125897 A1 | 5/2009 | Matlin et al. |
| 2009/0182825 A1* | 7/2009 | Fletcher .................. G06Q 10/00 709/206 |
| 2010/0082559 A1 | 4/2010 | Sumcad et al. |
| 2010/0228404 A1 | 9/2010 | Link, II et al. |
| 2010/0235433 A1 | 9/2010 | Ansari et al. |
| 2010/0241722 A1 | 9/2010 | Seminaro et al. |
| 2011/0045842 A1 | 2/2011 | Rork et al. |
| 2011/0105029 A1 | 5/2011 | Takayashiki et al. |
| 2011/0106375 A1 | 5/2011 | Gurusamy Sundaram |
| 2011/0112969 A1 | 5/2011 | Zaid et al. |
| 2011/0137490 A1 | 6/2011 | Bosch et al. |
| 2011/0306329 A1 | 12/2011 | Das |
| 2011/0307933 A1 | 12/2011 | Gavita et al. |
| 2012/0079149 A1 | 3/2012 | Gelvin et al. |
| 2012/0094643 A1 | 4/2012 | Brisebois et al. |
| 2012/0142367 A1 | 6/2012 | Przybylski |
| 2012/0245786 A1* | 9/2012 | Fedorchuk ............. H04L 69/18 701/29.1 |
| 2012/0330723 A1 | 12/2012 | Hedy |
| 2013/0031540 A1 | 1/2013 | Throop et al. |
| 2013/0130665 A1 | 5/2013 | Peirce et al. |
| 2013/0204455 A1 | 8/2013 | Chia et al. |
| 2013/0204466 A1 | 8/2013 | Ricci |
| 2013/0226393 A1 | 8/2013 | Julson et al. |
| 2014/0324275 A1 | 10/2014 | Stanek et al. |
| 2014/0380296 A1 | 12/2014 | Pal et al. |
| 2015/0003456 A1* | 1/2015 | Seo ........................ H04L 12/28 370/392 |
| 2015/0046080 A1 | 2/2015 | Wesselius et al. |
| 2015/0058946 A1 | 2/2015 | Salamon et al. |
| 2015/0128123 A1 | 5/2015 | Eling |
| 2015/0169311 A1 | 6/2015 | Dickerson et al. |

* cited by examiner

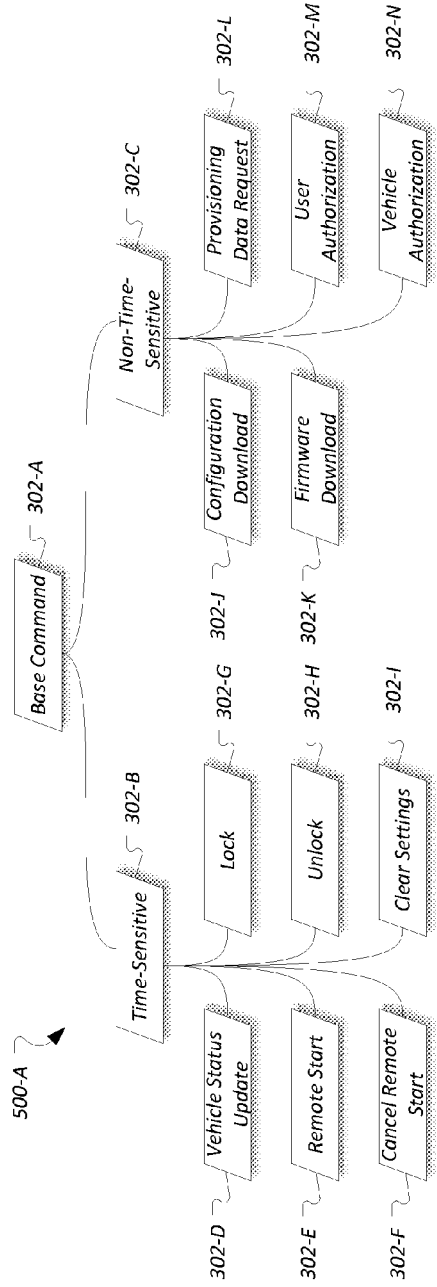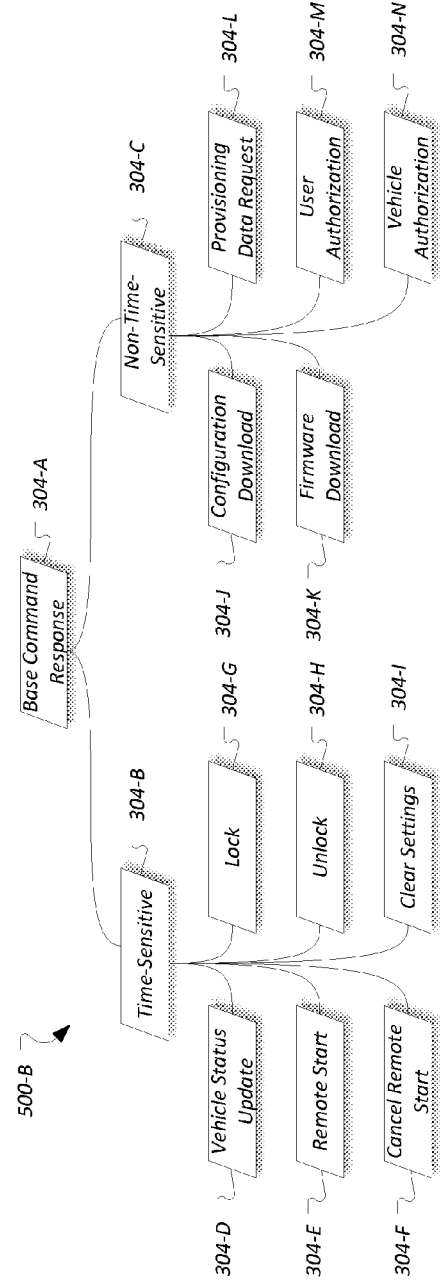

VEHICLE TELEMATICS DATA EXCHANGE

TECHNICAL FIELD

The illustrative embodiments generally relate to a method and apparatus for performing data exchange via vehicle telematics.

BACKGROUND

Vehicle telematics may be utilized to allow a user of a vehicle to interact with services available over a communications network. These services may include turn-by-turn directions, telephone communications, vehicle monitoring, and roadside assistance. In some cases, the telematics services may be provided by the vehicle or telematics unit manufacturer, while in other cases, the services may be provided by a third party telematics service provider. To allow these services to operate, a vehicle may communicate over the network and the services using a communications protocol known to both the vehicles and the services.

SUMMARY

In a first illustrative embodiment, a system includes a message publisher configured to identify a message to be published to a topic of a topic tree maintained by a message broker, the topic being associated with a type of the message identified to be published and an intended recipient of the message; pack data elements into the message according to a name/value pair message schema of the system; and publish the message via the message broker to the topic.

In a second illustrative embodiment, a system includes a message recipient configured to identify a message published by a message publisher to a topic of a topic tree maintained by a message broker, the topic being associated with a type of the message identified to be published and subscribed to by the message recipient; unpack data elements from the message according to a name/value pair message schema of the system; and process the message according to the type of the message.

BRIEF DESCRIPTION OF THE DRAWINGS

FIG. 5A illustrates an example command message hierarchy;

FIG. 5B illustrates an example command response message hierarchy;

DETAILED DESCRIPTION

Figure 1:
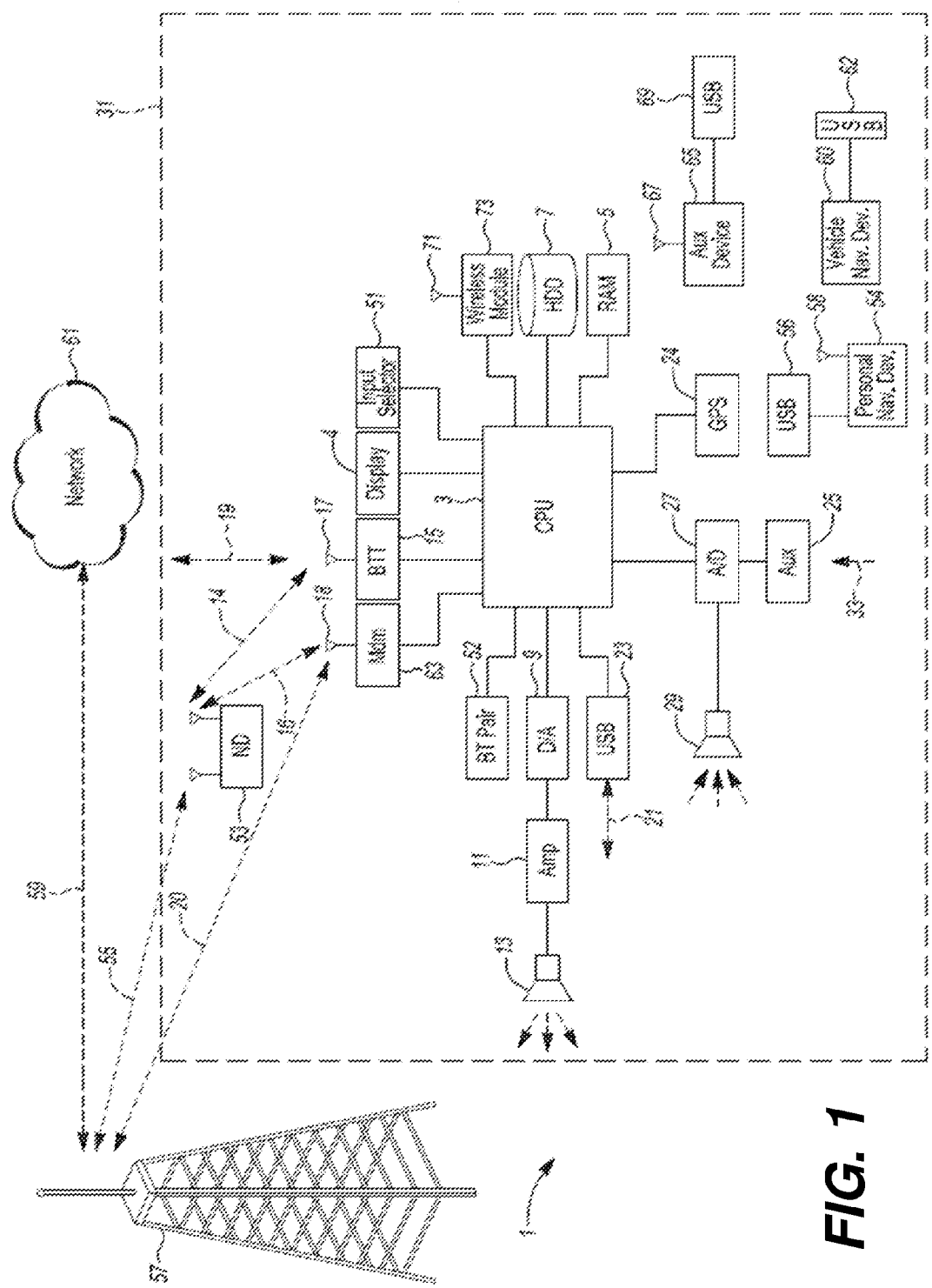
FIG. 1 illustrates an example block topology for a vehicle-based computing system for a vehicle.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A vehicle-to-cloud communication protocol may be designed to provide communication between a vehicle-based computing system (VCS), such as a telematics unit of a vehicle, and a service delivery network remote from the vehicle. The protocol may define a transport layer used to send message payloads between the VCS and the service delivery network, as well as a format for the payloads of the messages that are sent. The transport layer may utilize a publish/subscribe model for messaging transport, and the payload protocol may include a name/value pair model for the organization and serialization of the data structures being transported.

The publish/subscribe model may utilize topics, also known as logical channels, through which publishers may send messages and subscribers may receive messages. In some cases, a vehicle may be a publisher and may send vehicle alerts to a service delivery network, respond to commands from the service delivery network, or notify the service delivery network of vehicle connectivity status. In other cases, the vehicle may be a subscriber and may receive command messages or software updates from the service delivery network.

In the publish/subscribe model, a topic tree structure may be utilized by the service delivery network to define a structure of the topics and sub-topics that are used in sending messages between the vehicles and the service delivery network. For example, the VCS may subscribe to nodes of the topic tree that correspond to the installed software/firmware version of the vehicle and to the specific vehicle identifier (e.g., VIN) of the vehicle. In an example, message queue telemetry transport (MQTT) may be utilized as the transport protocol, providing publish/subscribe functionality as well as quality of service options for message delivery, such as best efforts delivery, assured delivery with a possibility of duplicates, and assured delivery with assurance of no duplicates. By use of the publish/subscribe model, the vehicles and service delivery network avoid use of a message delivery retry system, as such retry systems may be complicated and error-prone.

The name/value pair model may allow for data elements of the messages to be defined that vary according to the type of message being sent. Additionally, the name/value pair model may allow for subsets of data to be defined (e.g., information to include in messages from vehicles, information to be included in messages from the service delivery network, information describing the status of the vehicle, information describing a current location of a vehicle, etc.). These subsets of data may then be reused as a component in other message definitions, without the subset of data being redefined each time.

Moreover, by use of the name/value pair model for data transmission, the system may allow for addition of data elements to the message definition, without undesirably affecting deployed message recipients that implement communication with the service delivery network utilizing a previous version of the message definition. Rather, as the data elements are addressed by identifier and not by message location, updated framework modules may be utilized without affecting existing deployed applications or vehicles compiled against a previous version of the framework. In an example, Google protocol buffers may be utilized as the payload protocol, allowing for a message definition to be designed, and automatically generated into a framework module to be utilized in various programming languages. The packing of data performed by utilizing protocol buffers may allow for more efficient transfer of data than may be possible when utilizing a textual name/value pair framework such as extensible markup language (XML).

Accordingly, by using the publish/subscribe model and the name/value pair model in combination for vehicle-to-cloud communication, the protocol may offer a flexible and robust connectivity strategy for vehicle communications. While described herein with respect to vehicles-to-cloud communications, use of these models in combination may similarly be applicable to the vehicle-to-vehicle communication context.

FIG. 1 illustrates an example block topology for a vehicle-based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle 31. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 or central processing unit (CPU) 3 controls at least some portion of the operation of the vehicle-based computing system. Provided within the vehicle 31, the processor 3 allows onboard processing of commands and routines. Further, the processor 3 is connected to both non-persistent 5 and persistent storage 7. In this illustrative embodiment, the non-persistent storage 5 is random access memory (RAM) and the persistent storage 7 is a hard disk drive (HDD) or flash memory. In general, persistent (non-transitory) storage 7 can include all forms of memory that maintain data when a computer or other device is powered down. These include, but are not limited to, HDDs, compact disks (CDs), digital versatile disks (DVDs), magnetic tapes, solid state drives, portable universal serial bus (USB) drives and any other suitable form of persistent storage 7.

The processor 3 is also provided with a number of different inputs allowing the user to interface with the processor 3. In this illustrative embodiment, a microphone 29, an auxiliary input 25 (for input 33), a USB input 23, a global positioning system (GPS) input 24, a screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor 3. Although not shown, numerous of the vehicle components and auxiliary components in communication with the VCS 1 may use a vehicle network (such as, but not limited to, a car area network (CAN) bus) to pass data to and from the VCS 1 (or components thereof).

Outputs to the VCS system 1 can include, but are not limited to, a visual display 4 and a speaker 13 or stereo system output. The speaker 13 is connected to an amplifier 11 and receives its signal from the processor 3 through a digital-to-analog converter 9. Output can also be made to a remote BLUETOOTH device such as personal navigation device (PND) 54 or a USB device such as vehicle navigation device 60 along the bi-directional data streams shown at 19 and 21 respectively.

In one illustrative embodiment, the system 1 uses the BLUETOOTH transceiver 15 to communicate 17 with a nomadic device (ND) 53 (e.g., cell phone, smart phone, PDA, or any other device having wireless remote network connectivity). The nomadic device 53 can then be used to communicate 59 with a network 61 outside the vehicle 31 through, for example, communication 55 with a cellular tower 57. In some embodiments, tower 57 may be a WiFi access point.

Exemplary communication between the nomadic device 53 and the BLUETOOTH transceiver is represented by communication 14.

Pairing a nomadic device 53 and the BLUETOOTH transceiver 15 can be instructed through a button 52 or similar input. Accordingly, the CPU is instructed that the onboard BLUETOOTH transceiver 15 will be paired with a BLUETOOTH transceiver in a nomadic device 53.

Data may be communicated between CPU 3 and network 61 utilizing, for example, a data-plan, data over voice, or dual-tone multiple frequency (DTMF) tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem 63 and communication 20 may be cellular communication.

In one illustrative embodiment, the processor 3 is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the Institute of Electrical and Electronics Engineers (IEEE) 802 personal area network (PAN) protocols. IEEE 802 local area network (LAN) protocols include wireless fidelity (WiFi) and have considerable cross-functionality with IEEE 802 PAN. Both are suitable for wireless communication within a vehicle 31. Another communication means that can be used in this realm is free-space optical communication (such as infrared data association (IrDA)) and non-standardized consumer infrared (IR) protocols.

In another embodiment, nomadic device 53 includes a modem for voice band or broadband data communication. In the data-over-voice embodiment, a technique known as frequency division multiplexing may be implemented when the owner of the nomadic device 53 can talk over the device while data is being transferred. At other times, when the owner is not using the device, the data transfer can use the whole bandwidth (400 Hz to 3.4 kHz in one example). While frequency division multiplexing may be common for analog cellular communication between the vehicle 31 and the Internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle 31. 3G standards are now being replaced by IMT-Advanced (4G) which offers 200 mbs for users in a vehicle 31 and 1 gbs for stationary users. If the user has a data-plan associated with the nomadic device 53, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless LAN device capable of communication over, for example (and without limitation), an 802.11g network (i.e., WiFi) or a WiMax network.

In one embodiment, incoming data can be passed through the nomadic device 53 via a data-over-voice or data-plan, through the onboard BLUETOOTH transceiver and into the processor 3 of the vehicle 31. In the case of certain temporary data, for example, the data can be stored on the HDD or other storage media 7 until such time as the data is no longer needed.

Additional sources that may interface with the vehicle 31 include a PND 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU 3 could be in communication with a variety of other auxiliary devices 65. These devices 65 can be connected through a wireless 67 or wired 69 connection. Auxiliary device 65 may include, but are not limited to, personal media players, wireless health devices, portable computers, and the like.

Also, or alternatively, the CPU 3 could be connected to a vehicle-based wireless router 73, using for example a WiFi (IEEE 803.11) 71 transceiver. This could allow the CPU 3 to connect to remote networks within range of the local router 73.

In addition to having exemplary processes executed by a vehicle computing system located in a vehicle 31, in certain embodiments, the exemplary processes may be executed at least in part by one or more computing systems external to and in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process includes a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the VCS 1 located within the vehicle 31 itself is capable of performing the exemplary processes.

Figure 2:
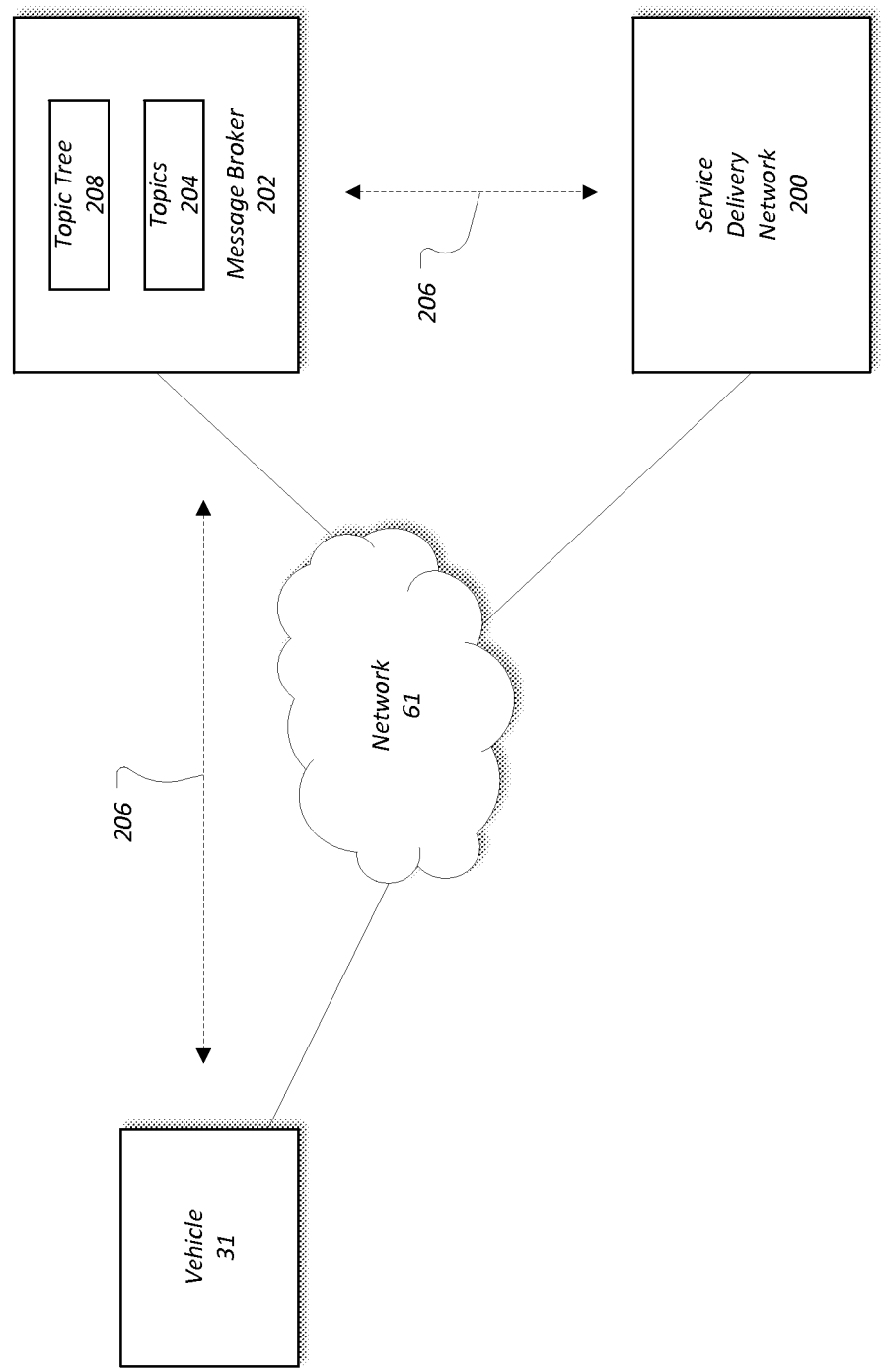
FIG. 2 illustrates an exemplary service delivery network in communication over the network with a vehicle by way of a message broker.

FIG. 2 illustrates an exemplary service delivery network 200 in communication over the network 61 with a vehicle 31 by way of a message broker 202. The vehicle 31 may be in wireless communication with the network 61 by way of the VCS 1 of the vehicle 31. When a vehicle 31 is assembled, the vehicle 31 may include various hardware and software components. Upon or after assembly, a VCS 1 of the vehicle 31 may be configured to query for existence and version information for at least a portion of these hardware and software components of the vehicle 31. Using the queried information and additional information identifying the specific vehicle 31 (e.g., vehicle identification number (VIN) information published on the car area network (CAN) bus, subscriber identity module (SIM) information of the modem 63 such as international mobile station equipment identity (IMEI), etc.), the VCS 1 may communicate via the network 61 and message broker 202 to establish an account with the service delivery network 200. The service delivery network 200 may receive these communications from the vehicles 31, and may maintain a data store of the hardware configurations and software (e.g., firmware, etc.) versions linked to identifiers of the vehicles 31.

The message broker 202 may additionally provide publish/subscribe messaging functionality for communication between the service delivery network 200 and the vehicles 31. The publish/subscribe model may utilize one or more topics 204, where topics 204 are named logical channels through which publishers may send messages 206 and subscribers may receive messages 206. Rather than receiving all the messages 206, subscribers to the topics 204 receive the messages 206 published to the topics 204 to which they subscribe, and all subscribers to a topic 204 will receive substantially the same topic messages 206.

Figure 3A:
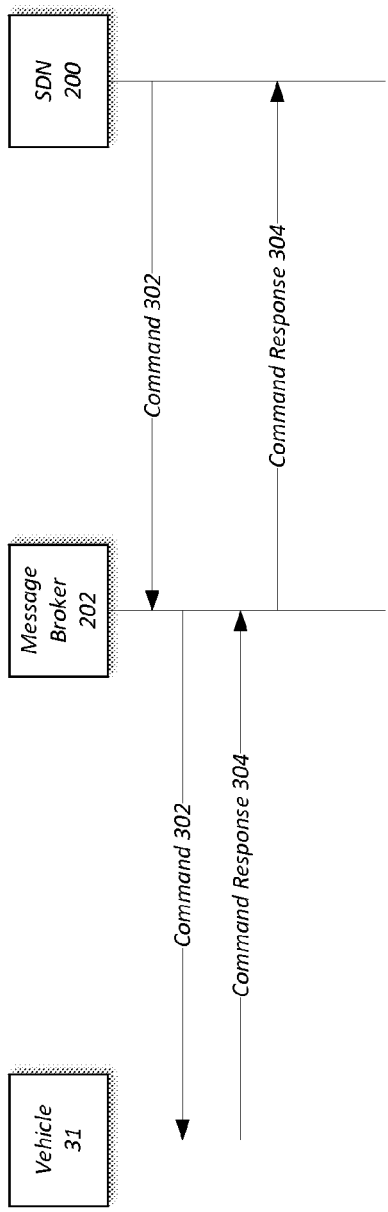
FIGS. 3A and 3B illustrate exemplary communications flows of messages between the vehicle and the service delivery network via the message broker.
Figure 3B:
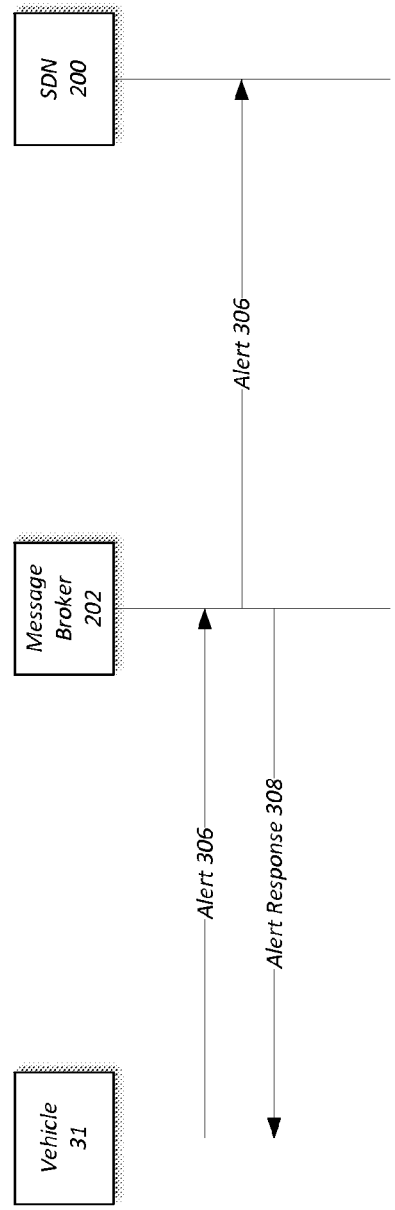

FIGS. 3A and 3B illustrate exemplary communications flows of messages 206 between the vehicle 31 and the service delivery network 200 via the message broker 202. Messages 206 may be of various categories, such as commands 302, command responses 304, and alerts 306.

As shown in FIG. 3A, a command 302 may be published by the service delivery network 200 to a topic of the message broker 202 that is subscribed to by vehicle 31. A command 302 is a type of message 206 that requests a recipient of the command 302 to perform an action specified by the command 302. A command response 304 is a message 206 provided back to a sender responsive to receipt of a command 302. The response 304 to the command 302 may be published by the vehicle 31 to a topic 204 subscribed to by the service delivery network 200. Commands 302 and command responses 304 are discussed in detail with respect to FIGS. 5A and 5B.

As shown in FIG. 3B, an alert 306 may be published by the vehicle 31 to a topic of the message broker 202 subscribed to by the service delivery network 200. An alert 306 is a type of message 206 providing information from a sender to a recipient, without requesting the performance of a particular action. Responsive to the alert 306, the message broker 202 may publish an alert response 308 to the vehicle 31, as the service delivery network 200 is not required to provide a response to the alert 306. Alerts are discussed in detail with respect to FIG. 5C.

A publisher of the messages 206 may be responsible for providing messages 206 to the topics 204 that are consistent with the topic 204. The publisher may include, for example for commands 302, an OEM or other entity responsible for maintaining and/or updating vehicle software/firmware. In some cases, a vehicle 31 may be a publisher and may send vehicle alerts 306 to a topic 204 subscribed to by the service delivery network 200, may use alerts 306 notify the service delivery network 200 of vehicle 31 connectivity status to the network 61, or may respond to messages 206 from the service delivery network 200 with command responses 304. In other cases, a vehicle 31 may be a subscriber and may receive commands 302 or other information from a service delivery network 200 via the message broker 202.

The messages 206 may utilize a name/value pair model may allow for data elements of the messages 206 to be defined and referenced by vehicles 31 and the service delivery network 200 by name. Each message 206 may include certain base fields present in all messages 206. Moreover, each category of message 206 may include a certain minimum set of data elements present in all messages 206 of that category. For example, alerts 306 or other messages 206 from the vehicle 31 to the service delivery network 200 may include a first set of common information useful for recipients of messages 206 from vehicles, and commands 302 or other messages 206 from the service delivery network 200 to the vehicle 31 may include a second set of common information useful for recipients of messages 206 from the service delivery network 200.

Depending on the type of the message 206 (e.g., the type of command 302), the message 206 may further include additional fields relevant to that specific message type 206. To do so, the name/value pair model may allow for subsets of data to be defined (e.g., information to include in messages 206 from vehicles 31, information to be included in messages 206 from the service delivery network 200, information describing the status of the vehicle 31, etc.) which may then be included in message 206 definitions without requiring redundant redefinition for each type of message 206 requiring the common information. Further, since the fields of the message 206 may be referenced by the vehicles 31 and service delivery network 200 by name or identifier (rather than by raw byte offset into the message 206), the system may allow for the addition of data elements to the message 206 definitions (or to the common information definitions) without undesirably affecting deployed vehicles 31 that implement communication with the service delivery network 200 utilizing a previous version of the message 206 definitions.

With respect to the processing of the various categories of messages 206 published to the topics 204, the vehicle 31 may be configured to execute commands 302 that it receives from the service delivery network 200 in the order in which the commands 302 were received. To do so, the vehicle 31 may be configured to maintain a command queue of received commands 302, to allow the vehicle 31 to execute the received commands 302 from the queue in the a first-in-first-out (FIFO) manner. The vehicle 31 may also be configured to execute alerts 306 in the order they take place on vehicle 31 side. To do so, the vehicle 31 may be configured to maintain an alert queue so that it may execute the alerts 306 from the queue in a last-in-first-out (LIFO) manner. In the case of a conflict between a command 302 and an alert 306, the vehicle 31 may be configured to execute the messages 206 in the order they are received from the service delivery network 200 or took place on the vehicle 31 based on time stamps of the messages 206.

The topics 204 may be utilized to allow the messages 206 to be published to or from the appropriate vehicles 31 and in the proper category of message 206. To facilitate the publishing of messages 206 to appropriate topics 204, the topics 204 may be arranged into a topic tree 208. The topic tree 208 may be defined by the service delivery network 200 to provide a structure of the topics 204 and sub-topics 204 that are used in sending messages 206 between the vehicles 31 and the service delivery network 200.

Figure 4:
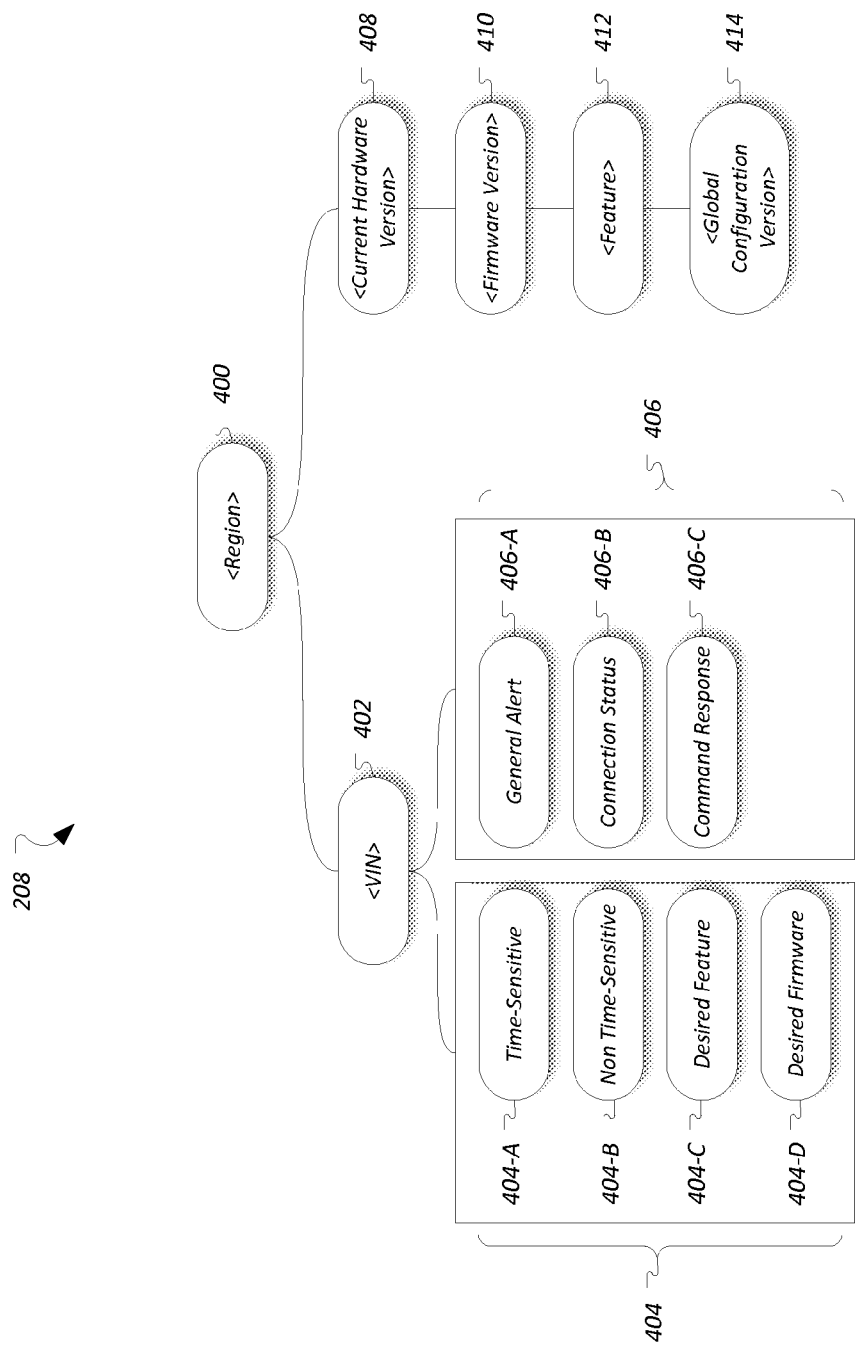
FIG. 4 illustrates an exemplary topic tree for use in vehicle-based computing system and service delivery network communication.

FIG. 4 illustrates an exemplary topic tree 208 for use in VCS 1/service delivery network 200 communication. A VCS 1, such as a telematics unit of a vehicle 31, may subscribe to nodes of the topic tree 208 that correspond to the installed region, software/firmware version, features, configuration file version of the vehicle 31, etc. It should be noted that the particular layout of the exemplary topic tree 208 is for purpose of illustration only, and other layouts of topic tree 208 may be used. For example, other topic trees 208 may be used by the service delivery network 200 that have more, fewer or different levels of categorization.

Referring to the topic tree 208 of FIG. 4, a region node 400 of the topic tree 208 may indicate a region for which the sub-topic 204 nodes under the region node 400 may relate. In some cases, the region nodes 400 may represent different regional market areas in which vehicles 31 may be sold, such as North America, Europe, and Asia Pacific. In other examples the region nodes 400 may relate to other geographical areas, such as countries, states, postal codes, and telephone area codes, as some other examples. By segmenting the topic tree 208 by region, the service delivery network 200 may accordingly publish different information for vehicles 31 associated with different regions.

Under each region node 400, the topic tree 208 may include one or more vehicle-specific nodes 402, where each vehicle-specific node 402 relates to a vehicle 31 associated with the parent regional node 400. As one possibility, the service delivery network 200 may create vehicle-specific nodes 402 for vehicles 31 according to VIN or other unique identifier of vehicles 31 that register with the service delivery network 200 as belonging to the particular region. Sub-nodes to the vehicle-specific nodes 402 may be used to further organize topics 204 configured for communication to and from the individual vehicles 31.

For instance, under the vehicle-specific nodes 402, the topic tree 208 may further include one or more vehicle topic nodes 404 for communication to the specific vehicles 31. A vehicle 31 may subscribe to the vehicle topic node 404 that correspond to the VIN or other unique identifier of the vehicle 31, so that the vehicle 31 may be able to receive messages 206 in topics 204 that specifically relate to the vehicle 31 itself.

As one example, a vehicle 31 may subscribe to a time-sensitive update vehicle topic node 404-A for receiving messages 206 (such as time-sensitive commands 302 as discussed in more detail below) for the particular vehicle 31 that are of a time-sensitive nature. Due to their time-sensitive nature, messages 206 posted to the time-sensitive update vehicle topic node 404-A may time out and be removed from the topic 204 if they are not received by the vehicle 31 within an amount of time (e.g., an amount of time specified by the message 206, an amount of time common to all time-sensitive messages 206, etc.). As another example, a vehicle 31 may subscribe to a non-time-sensitive vehicle topic node 404-B for receiving messages 206 for the particular vehicle 31 that not of a time-sensitive nature (e.g., non-time-sensitive commands 302, also discussed in more detail below).

Updates, such as calendar updates, may be posted to the non-time-sensitive vehicle topic node 404-B, and may remain in the topic 204 until received by the subscribed vehicle 31. As a further example, a vehicle 31 may subscribe to a feature update vehicle topic node 404-C for receiving messages 206 in a topic 204 directed to particular vehicles 31 and relating to updates to the features 31 of the vehicle 31. In this content, a feature may refer to a grouping of configuration parameters applicable to the specified vehicle 31 included in the topic tree 208. A feature may, for example, represent settings to implement an available connected service (e.g., MY FORD MOBILE) or a customer-specific collection of settings (e.g., a suite of features requested to be enabled and/or disabled for use by a particular fleet purchaser). As yet a further example, a vehicle 31 may subscribe to a firmware update vehicle topic node 404-D for receiving messages 206 in a topic 204 directed to particular vehicles 31 and relating to updates to the firmware of the vehicle 31.

The vehicle-specific nodes 402 of the topic tree 208 may further include one or more vehicle topic nodes 406 for communication from the specific vehicles 31 (e.g., to the service delivery network 200). For example, a general alert topic node 406-A may be used by a vehicle 31 to publish messages 206 (e.g., alerts 306) such as indications of low fuel, erratic driving by the vehicle 31, or periodic current vehicle 31 GPS locations. As another example, a connection status topic node 406-B may be used by a vehicle 31 to publish messages 206 such as the connection status of the vehicle 31 (e.g., alerts 306 indicating whether the vehicle 31 was disconnected and then reconnected to the network 61). As yet a further example, a command response alert topic node 406-C may be used by a vehicle 31 to publish messages 206 such as alerts 306 indicating success or failure of command 302 requested by the service delivery network 200.

Moreover, under each region node 400 the topic tree 208 may include one or more hardware version topic nodes 408, where each hardware version topic node 408 relates to a installed vehicle 31 hardware version that may be shared by multiple vehicles 31 (e.g., a version of the VCS 1 hardware). These hardware version topic nodes 408 and sub-topic nodes may accordingly be used to reference the vehicles 31 according to hardware version, not according to individual vehicle 31.

Under each hardware version topic node 408, the topic tree 208 may include one or more firmware version nodes 410. Each firmware version node 410 may organize nodes of the topic tree 208 associated with a firmware version that may be installed on the parent tree relationship vehicle 31 hardware for a particular region.

The firmware version node 410 may further include feature nodes 412 organizing nodes of the topic tree 208 associated with a particular feature. As mentioned above, a feature may represent settings to implement an available connected service or a customer-specific collection of settings. Thus, a firmware version may support multiple different features, where different portions of functionality of the firmware are engaged or disengaged for the various features.

The feature nodes 412 may further include configuration version nodes 414, each representing a topic 204 related to a version of a configuration file for the associated feature, firmware version, hardware version, and region. The configuration files may include setting and other information related to the parent features that they configure (e.g., for the version of firmware installed on the version of hardware for the particular region). Because settings and other options may change from version to version, the configuration files may also include a version number of the firmware for which they are compatible.

A vehicle 31 may subscribe to topics of 204 the topic tree 208 that relate to the configuration of the vehicle 31. As one example, a vehicle may subscribe to a vehicle topic node 404 corresponding to the VIN of the vehicle 31, to receive any updates targeting the specific vehicle 31. As another example, a VCS 1 of a vehicle 31 may subscribe to a configuration version node 414 of the topic tree 208, to receive configuration or other updates corresponding to the installed region, hardware version, firmware version, feature, and global configuration version of the vehicle 31. The subscribed vehicle 31 may check or otherwise be informed of messages 206 published to the subscribed topics 204.

The service delivery network 200 may publish messages 206 into topics 204 of the topic tree 208 for which updates are to be performed. As one possibility, the service delivery network 200 may publish a command 302 into a vehicle topic node 404 to cause a particular vehicle 31 to be informed that an update should be performed for the vehicle 31. As another possibility, the service delivery network 200 may publish a command 302 into a configuration version node 414 to cause any subscribed vehicles 31 having a particular region, hardware version, firmware version, feature, and global configuration version to perform an update.

FIG. 5A illustrates an example command message hierarchy 500-A. The command message hierarchy 500-A illustrates an exemplary relationship of the various types of commands 302 for use with the topic tree 208. For example, the hierarchy 500-A includes the commands 302 such as a vehicle status update command 302-D, a remote start command 302-E, a cancel remote start command 302-F, a lock command 302-G, an unlock command 302-H, a clear settings command 302-I, a configuration download command 302-J, a firmware download command 302-K, a provisioning data request command 302-L, a user authorization command 302-M, and a vehicle authorization command 302-N. These commands 302 are organized in the hierarchy 500-A under a base command 302-A as being either time-sensitive commands 302-B or non-time-sensitive commands 302-C. It should be noted that the base command 302-A, time-sensitive command 302-B, and non-time-sensitive commands 302-C are included in the hierarchy 500-A for purposes of definition and organization, and are not typically commands 302 that may be sent to vehicles 31. It should also be noted that the particular command message hierarchy 500-A of FIG. 5A is for purpose of illustration only, and other organizations of commands 302 may be used. For example, other hierarchies 500-A may be used by the service delivery network 200 that have more, fewer or different levels of organization of commands 302.

With respect to the structure of the commands 302, each command 302 may include a certain minimum set of data elements. These common elements may be referred to as the base command 302-A data elements, and may serve to provide basic information about the command 302 as well as information regarding the command 302 type. For instance, a base command 302-A may include name/value pairs such as: a value indicative of whether the command 302 is time-sensitive, a reference to a time-sensitive structure that is valid if the value indicates the command 302 is time-sensitive, and a reference to a non-time-sensitive structure that is valid if the value indicates the command 302 is not time-sensitive.

Commands 302 may further include additional base name/value pairs defined in a structure of common information for messages 206 published by the service delivery network 200, such as: a date/time at which the message 206 was sent, a unique identifier of the message 206, and for cases where the message 206 is a command 302, a correlation identifier to be used in a response 304 message as the unique identifier of the response to the command 302.

As defined by the base command 302-A, the commands 302 may be divided into time-sensitive 302-B and non-time-sensitive 302-C categories (e.g., corresponding to the time-sensitive and non-time-sensitive vehicle topic nodes 404-A and 404-B). Time sensitive commands 302-A are commands of types that should timeout if they are not executed within a period of time. For example, commands to the vehicle 31 to update vehicle status information, initiate remote start of the vehicle 31, cancel remote start of the vehicle 31, lock the vehicle 31, unlock the vehicle 31, and clear user settings may be considered time-sensitive commands 302. Non-time-sensitive commands 302-C are commands that are not required to be performed within a particular time window, but that should be performed. Examples of non-time-sensitive commands may include user authorization commands 302, VCS 1 authorization change commands 302, and provisioning data request commands 302.

The time-sensitive structure 302-B may further include information useful for time-sensitive commands 302-B, in addition to the information of the base command 302-A. For instance, a time-sensitive command 302-B may include name/value pairs such as: an identifier of the type of time-sensitive command 302-B, and for each type of time-sensitive command 302-B specified by the identifier, an associated reference to a data structure that is valid for that the type of time-sensitive command 302-B specified by the identifier. For instance, if the time-sensitive command 302-B is a vehicle status update command 302-D, then the identifier may indicate that the command is a vehicle status update command 302-D, and a reference to a vehicle status update-specific structure may be valid and may include information specific to the vehicle status update command 302-D. Other types of time-sensitive command 302-B may include a remote start command 302-E, a cancel remote start command 302-F, a lock command 302-G, an unlock command 302-H, and a clear settings command 302-I.

The non-time-sensitive structure 302-C may include information useful for non-time-sensitive commands 302. For instance, a non-time-sensitive command 302-C may include name/value pairs such as: an identifier of the non-time-sensitive command 302-C, and for each type of non-time-sensitive command 302-C specified by the identifier, an associated reference to a data structure that is valid for that the type of non-time-sensitive command 302-C specified by the identifier. For instance, if the time-sensitive command 302-C is a configuration download command 302-J, then the identifier may indicate that the command is a configuration download command 302-J, and a reference to a configuration download-specific structure may be valid and may include information specific to the configuration download command 302-J. Other types of non-time-sensitive command 302-C may include a firmware download command 302-K, a provisioning data request command 302-L, a user authorization command 302-M, and a vehicle authorization command 302-N.

FIG. 5B illustrates an example command response message hierarchy 500-B. The VCS 1 may be configured to send a command response 304 after receiving a command 302. The type of command response 304 that is sent may depend on the type of command 302 being responded to by the command 302 recipient. In the case of some commands 302 (for example a lock command 302-G) the command response 304 may indicate the success or failure of the action (doors locked successfully or did not lock successfully). In other cases, however, the command response 304 may indicate that the action is in-progress (for example, after an authorization command 302-M or firmware download command 302-K) and an alert 306 may be sent later indicating the success or failure of the action (explained in further detail below with respect to alerts 306).

Similar to with the commands 302, with respect to the structure of the command responses 304, each response 304 may include a certain minimum set of data elements. For example, the base command response 304-A may include name/value pairs such as: a value indicative of whether the response 304 is to a time-sensitive command 302-B, a reference to a time-sensitive response structure 304-B that is valid if the value indicates that the response 304 is to a time-sensitive command 302-B, and a reference to a non-time-sensitive response structure 304-C that is valid if the value indicates the response 304 is to a non-time-sensitive command 302-C.

The command responses 304 may further include additional name/value pairs defined in a structure of common information for messages 206 from the vehicle 31 to the service delivery network 200, such as: a date/time of an event precipitating the sending of the message 206, an identifier of the sending vehicle 31 such as a VIN, a serial number or other identifier of the VCS 1, a serial number such as a subscriber identity module serial number (ICCID) or other wireless carrier identifier of the vehicle 31, a hardware part number for the VCS 1, a firmware version of the VCS 1, a configuration version of the VCS 1, a unique identifier of the message 206 (e.g., a random number, a sequence number, etc.) and the correlation identifier specified by the command 302 prompting the command response 304.

The time-sensitive response structure 304-B may further include information useful for time-sensitive responses 304-B, in addition to the information of the base command response 304-A. For instance, a time-sensitive command response 304-B may include name/value pairs such as: an identifier of the type of time-sensitive command response 304-B, and for each type of time-sensitive command response 304-B specified by the identifier, an associated reference to a data structure that is valid for that the type of time-sensitive command response 304-B specified by the identifier. For instance, if the time-sensitive command response 304-B is a vehicle status update command response 304-D, then the identifier may indicate that the command is a vehicle status update command response 304-D, and a reference to a vehicle status update response-specific structure may be valid and may include information specific to the vehicle status update response 304-D. Other types of time-sensitive command response 304-B may include a remote start command response 304-E, a cancel remote start command response 304-F, a lock command response 304-G, an unlock command response 304-H, and a clear user settings command response 304-I. Time sensitive responses 304 may include additional information as well, such as such as the information common to messages from vehicles 31, the current status of the requested command (e.g., success, failure, in progress, etc.), and information regarding any errors that may have been encountered.

The non-time-sensitive response structure 304-C may include information useful for non-time-sensitive command responses 304-C. For instance, a non-time-sensitive command response 304-C may include name/value pairs such as: an identifier of the non-time-sensitive command response 304-C, and for each type of non-time-sensitive command response 304-C specified by the identifier, an associated reference to a data structure that is valid for that the type of non-time-sensitive command response 304-C specified by the identifier. For instance, if the time-sensitive command response 304-C is a configuration download command response 304-J, then the identifier may indicate that the command is a configuration download command response 304-J, and a reference to a configuration download response-specific structure may be valid and may include information specific to the configuration download command response 304-J. Other types of non-time-sensitive command response 304-C may include a firmware download command response 304-K, a provisioning data request command response 304-L, a user authorization command response 304-M, and a vehicle authorization command response 304-N. Non-time sensitive responses 304 may also include additional information as well, such as such as the information common to messages from vehicles 31, the current status of the requested command (e.g., success, failure, in progress, etc.), and information regarding any errors that may have been encountered.

Referring back to FIG. 3A and with reference to FIGS. 4, 5A and 5B, these and other types of commands 302 and command responses 304 may be utilized by the vehicle 31 and service delivery network 200 to perform various actions.

For example, the vehicle status update 302-D command may be published by the service delivery network 200 to a topic 204 of the vehicle 31 (e.g., time-sensitive topic node 404-A) to request the vehicle 31 to provide an update of vehicle 31 information to the service delivery network 200. The vehicle status response 304-D published by the vehicle 31 (e.g., to command response topic node 406-C) may include name/value pairs defined in a structure of common vehicle status information for messages 206 from the vehicle 31 to the service delivery netbook 200, such as: vehicle 31 window positions, which vehicle 31 doors are ajar (e.g., driver door, passenger door, driver rear door, passenger rear door, hood, trunk, tailgate door, inner tailgate door, etc.), door lock status information, whether the vehicle is in motion, remote start status and settings, 12 Volt vehicle battery status, tire pressure status, ignition status, perimeter alarm status, fuel level, engine oil life, vehicle speed, distance until empty fuel, current odometer reading, GPS information, and an identifier of the active key used to start the vehicle 31. The vehicle 31 may be configured to fill the vehicle status information structure using sources of information such as the CAN bus or various vehicle 31 sensors.

The initiate remote start command 302-E may be published by the service delivery network 200 to request the vehicle 31 to start (e.g., to the time-sensitive topic node 404-A based on a request from a user's mobile device sent to the service delivery network 200). The cancel remote start command 302-F may similarly be published by the service delivery network 200 to request the vehicle 31 to cancel any requested remote start events. The lock command 302-G may be similarly published by the service delivery network 200 to request the vehicle 31 to lock the doors, and the unlock command 302-H may similarly be published by the service delivery network 200 to request the vehicle 31 to unlock. The clear user settings command 202-I may be published by the service delivery network 200 to request the vehicle 31 to clear all user settings and to set the VCS 1 authorization status to waiting for authorization.

Responsive to receipt of any of these time-sensitive commands 302-B, the VCS 1 may be configured to unpack the name/value pairs of the command 302, determine the type of the command 302, and attempt to perform the command 302. The VCS 1 may be further configured to publish a time-sensitive command response 304-B (e.g., to the command response topic node 406-C of the vehicle 31, of the type corresponding to the command 302), responsive to making the attempt to perform the command 302. The response 304 may include, as discussed above, the vehicle status when attempting to perform the command 302, common name/value pairs provided for messages 206 from the vehicle 31 to the service delivery netbook 200, and a status indicative of whether the command 302 was successful (e.g., whether the vehicle was started or not for an initiate remote start command 302-E). If an error was encountered processing the command 302, the response 304 may further include an optional error code that identifies a reason for the failure (e.g., if the command 302 was not of a type not recognized by the VCS 1).

The configuration download command 302-J may be published by the service delivery network 200 to a topic 204 of the vehicle 31 (e.g., topic node 414) to request the vehicle 31 to download a new vehicle 31 configuration. The firmware download command 302-K may be published by the service delivery network 200 to a topic 204 of the vehicle 31 (e.g., topic node 410 for updates to vehicles 31 at a particular firmware version, to topic node 404-D for updates to a specific vehicle 31, etc.) to request the vehicle 31 to download a new firmware version. These commands 302 may be responded to by acknowledgements that indicate that the commands 302 were received (e.g., via responses 304 published to the topic node 406-C), not that the download was completed or installed.

The provisioning data request command 302-L may be published by the service delivery network 200 to a topic 204 of the vehicle 31 (e.g., topic node 404-B) to allow the service delivery network 200 to recover if the VCS 1 does not properly publish a provisioning alert 306 (discussed below) or if a provisioning message 206 is lost or otherwise not received by the service delivery network 200. The provisioning data request command 302-L accordingly causes the vehicle 31 to publish a provisioning data request command response 304-L (e.g., to topic node 406-C) including the common response 304 information, plus a command status indicative of whether the latest VCS 1 status change was successful, an optional error code if the command 302 is not recognized by the vehicle 31, and a current provisioning data from the vehicle 31 that was not received by the service delivery network 200. The current provisioning data may include, for example, modem information of the VCS 1, such as international mobile subscriber identity (IMEI), mobile station international subscriber directory number (MSISDN), international mobile subscriber identity (IMSI), as well firmware or other system information of the vehicle 31.

The user authorization command 302-M may be published by the service delivery network 200 to a topic 204 of the vehicle 31 (e.g., topic node 404-B) to provide application-layer authorization that allows a connected services application to identify a user as the true owner of the vehicle 31. In many applications, an in-vehicle authorization may be required to "turn on" the service functions of the VCS 1. The user authorization command 302-M and associated user authorization command response 304-M (e.g., published by the vehicle 31 to topic node 406-C) may accordingly identify to the service delivery network 200 that the vehicle 31 has received a request for authorization. Notably, the user authorization command 302-M/response 304-M sequence may not confirm the user's completion of the authorization sequence (i.e., hitting "allow" on the touchscreen). Rather, the response of the user to the authorization requests may be sent to the service delivery network 200 through an alert 306 (discussed in detail below). In the user authorization command 302-M, the service delivery network 200 may provide information such as: an identifier of the new owner of the vehicle 31 (e.g., an e-mail address or other string of characters that identify a user), and a request type identifies if the request is the initial request or the final request for the authorization sequence. Upon receipt of the user authorization command 302-M, the VCS 1 may decode the command 302-M and publish the user authorization command response 304-M. The user authorization command response 304-M may include information such as: a response type defining whether the command 302 was successfully fulfilled (e.g., the command 302 was able to be decoded and an in-vehicle authorization message is ready in-vehicle for the user) or if the command 302 failed (e.g., the command 302 was unable to be executed or the authorization message is not ready in-vehicle the VCS 1), and an optional error code that if the command 302 fails identifies a reason for the failure.

The vehicle authorization change command 302-N may be utilized to allow for a manual change of the authorization state of a vehicle 31. To do so, the authorization change command 302 (e.g., published to vehicle 31 topic node 404-B by the service delivery network 200) may include information such as an authorization status that the service delivery network 200 is requesting the vehicle 31 to change to. In response the authorization change command response 304 (e.g., published to topic node 406-C) may include information to allow the service delivery network 200 to be informed of whether the command 302 succeeded. This information may include, for example, the current authorization status of the vehicle 31 (e.g., as part of the common response 304 information), a status indicative of whether the authorization change command 302 was successful, and if the authorization change command 302 was unsuccessful, an error code indicative of the reason for the failure (e.g., the vehicle 31 does not recognize the authorization status being requested for the vehicle 31).

Figure 5C:
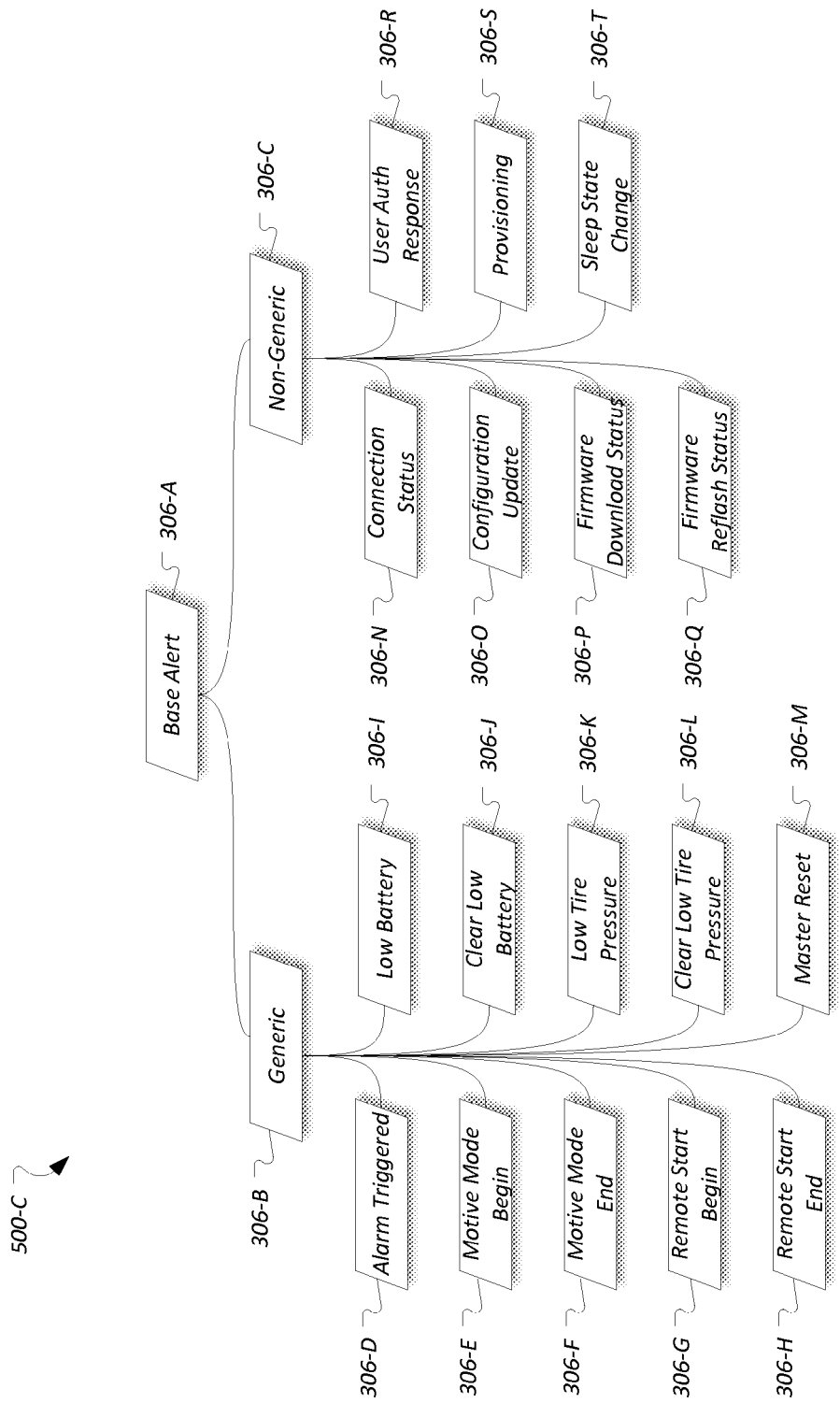
FIG. 5C illustrates an example alert message hierarchy.

FIG. 5C illustrates an example alert message hierarchy 500-C. The alert message hierarchy 300-C illustrates an exemplary relationship of the various types of alerts 306 for use with the topic tree 208. For example, the hierarchy 500-C includes alerts 306 such as an alarm triggered alert 306-D, a motive mode begin alert 306-E, a motive mode end alert 306-F, a remote start begin alert 306-G, a remote start end alert 306-H, a low battery alert 306-I, a clear low battery alert 306-J, a low tire pressure alert 306-K, a clear low tire pressure alert 306-L, a master reset alert 306-M, a connection status alert 306-N, a configuration update alert 306-O, a firmware download status alert 306-P, a firmware reflash status alert 306-Q, a user authorization response alert 306-R, a provisioning alert 306-S, and a sleep state change alert 306-T. These alerts 306 are organized in the hierarchy 500-C under a base alert 306-A as being either generic alerts 306-B or non-generic alerts 306-C. The generic alerts 306-B may have a common message 206 structure while the non-generic alerts 306-C may be those alerts 306 that may include additional information not found in the common structure. It should be noted that the base alert 306-A, generic alert 306-B and non-generic alert 306-C are included in the hierarchy 500-C for purposes of definition and organization, and are typically not alerts 306 that may be sent from vehicles 31. It should also be noted that the particular alert message hierarchy 500-C of FIG. 5C is for purpose of illustration only, and other organizations of alerts 306 may be used. For example, other hierarchies 500-C may be used by the service delivery network 200 that have more, fewer or different levels of organization of alerts 306.

The alerts 306 may include various vehicle-initiated sequences. If the VCS 1 identifies a condition for which it should send an alert 306 to the service delivery network 200, the VCS 1 may utilize an alert 306 sequence such as that such discussed above with respect to FIG. 3B. Generally with respect to the alerts 306, if the VCS 1 does not receive a delivery token from the message broker 202 within defined period of time (e.g., within a configurable acknowledgement timeout value maintained by the VCS 1), the VCS 1 may retry sending this alert 306 with a different message identifier (e.g., a random identifier as mentioned above). If this fails, the VCS 1 may retry a set number of times, generating a new unique message identifier for each attempt. The number of retry attempts may be a configurable parameter, e.g., a maximum retries setting. If these retry attempts fail, the VCS 1 may queue the alert 306 to be sent at a later time. For instance, when a newer session has been successfully established between the vehicle 31 and the message broker 202, any alerts 306 that could not be sent may be resent with new message identifiers.

Similar to with the commands 302 and responses 304, with respect to the structure of the alerts 306, each alerts 306 may include a certain minimum set of data elements. For example, the base alert 306-A may include name/value pairs such as: a value indicative of whether the alert 306 is to a generic alert 306-B, a reference to a generic alert 306-B that is valid if the value indicates that the alert 306 is a generic alert 306-B, and a reference to a non-generic alert structure 306-C that is valid if the value indicates the alert 306 is to a non-generic alert 306-C.

The generic alert structure 306-B may further include information useful for generic alerts 306-B, in addition to the information of the base alert 306-A. For instance, a generic alert 306-B may include name/value pairs such as: a value indicative of the type of the generic alert 306-B, as well as references to the various types of generic alert 306 (e.g., alarm triggered alert 306-D, motive mode begin alert 306-E, motive mode end alert 306-F, remote start begin alert 306-G, remote start end alert 306-H, low battery alert 306-I, clear low battery alert 306-J, low tire pressure alert 306-K, clear low tire pressure alert 306-L, master reset alert 306-M, etc.), where the reference indicated by the value is valid.

Each of the types of generic alert 306-B may further include additional common name/value pairs provided for messages 206 from the vehicle 31 to the service delivery netbook 200 discussed above, such as: a date/time of an event precipitating the sending of the message 206, an identifier of the sending vehicle 31 such as a VIN, a serial number or other identifier of the VCS 1, a serial number such as a subscriber identity module serial number (ICCID) or other wireless carrier identifier of the vehicle 31, a hardware part number for the VCS 1, a firmware version of the VCS 1, a configuration version of the VCS 1, a unique identifier of the message 206 (e.g., a random number, a sequence number, etc.) and the correlation identifier specified by the command 302 prompting the alert 306 (if applicable). Each of the types of generic alert 306-B may also include the common vehicle status information discussed above with respect to the vehicle status update response 304-D. The alerts 306 may be published, for example, by the vehicle 31 to the topic node 406-A of the vehicle 31 in the topic tree 208.

The alarm triggered alert 306-D may be published by the VCS 1 upon condition that an alarm was triggered by the vehicle 31 (e.g., a perimeter alarm condition raised by the vehicle 31 security system). The motive mode begin alert 306-E may be published by the VCS 1 upon condition that the vehicle 31 has entered motive mode (e.g., the vehicle 31 engine is running and torque is available to the wheels). The motive mode end alert 306-F may be published by the VCS 1 upon condition that the vehicle 31 has exited motive mode (e.g., the vehicle 31 engine has stopped and no torque is available to the wheels). The remote start begin alert 306-G may be published by the VCS 1 upon condition that the vehicle 31 has begun a remote start sequence. The remote start end alert 306-H may be published by the VCS 1 upon condition that the vehicle 31 has ended a remote start sequence. The low battery alert 306-I may be published by the VCS 1 upon condition that the vehicle 31 has detected that the 12 Volt battery is low. The clear low battery alert 306-J may be published by the VCS 1 upon condition that the vehicle 31 has detected that the 12 Volt battery is no longer low. The low tire pressure alert 306-K may be published by the VCS 1 upon condition that that the vehicle 31 has detected that the pressure of one or more tires is low. The clear low tire pressure alert 306-L may be published by the VCS 1 upon condition that the vehicle 31 has detected that the pressure of one or more tires is no longer low.

The master reset alert 306-M may be published by the VCS 1 upon condition that the vehicle 31 has performed an in-vehicle factory or master reset. The reset may be triggered, for example, by a master reset CAN message. When the message is sent, the VCS 1 may be configured to return all user settings to default settings, confirm that the master reset has been performed, and sent the master reset alert 306-M to the service delivery network 200.

The connection status alerts 306-N may be published by the VCS 1 (e.g. to topic node 406-B rather than to topic node 406-A) to allow the message broker 202 and service delivery network 200 to maintain information regarding the connected status of the vehicle 31. The connection status alerts 306-N may be published by the vehicle 31 when the vehicle 31 has established a new session with the message broker 202, or when the VCS 1 gracefully terminates a session with the message broker 202. The VCS 1 may be configured to send the connection status alert 306-N with a quality of service of guaranteed delivery without duplicates. The connection status alert 306-N may include information such as the common from vehicle 31 information, and a status of the vehicle 31 connection (e.g., "connected", "disconnected", "lost connection").

When connecting, the VCS 1 may set for vehicle 31 subscriptions to the topics 204 to remain despite vehicle 31 disconnection from the message broker 202. This may allow for the vehicle 31 to maintain its subscriptions to the topics 204, despite the intermittently connected nature of the vehicle 31.

When the VCS 1 first establishes the connection with the message broker 202, the VCS 1 may report a connection status of "connected" via the connection status alert 306-N. When the VCS 1 receives a delivery token after sending its "connected" alert 306-N, the VCS 1 may be configured to continue to maintain the client connection to the message broker 202 to allow the VCS 1 to publish and receive messages 206. As mentioned above, if the VCS 1 does not receive the delivery token from the message broker 202 within a defined period of time (e.g., within a predetermined timeout period), the VCS 1 may be configured to retry sending the connection status alert 306-N with a different message identifier. When the VCS 1 gracefully disconnects from message broker 202, the VCS 1 may be configured to provide a connection status alert 306-N reporting a status of "disconnected." If the VCS 1 receives a delivery token after sending its "disconnected" alert 306-N, the VCS 1 may be configured to gracefully tear down the connection to the message broker 202, followed by terminating the underlying connection (e.g., a cellular connection of the VCS 1 via the network 61).

When connecting, the VCS 1 may make an asynchronous connection with the message broker 202. The VCS 1 may further implement a lost connection mechanism to allow the message broker 202 to be informed of vehicles 31 that have lost connectivity (e.g., upon entering a tunnel or other dead zone without wireless connectivity (e.g., cellular connectivity)). The lost connection mechanism may operate by having the VCS 1 periodically publish messages 206 indicative of continued connection to the message broker 202 (e.g., periodic connection status alerts 306-N). Thus, if one or more periodic messages 206 are not published, the message broker 202 and service delivery network 200 may be able to infer that the vehicle 31 connection was lost. Thus, the connection status of vehicles 31 may be accurately maintained with respect to connection, graceful disconnection, and lost connection status.

The configuration update alert 306-O may be published by the VCS 1 upon condition that the vehicle 31 has downloaded or has failed to download a configuration update specified to the vehicle 31 by way of a configuration download command 302-J published by the service delivery network 200 to a topic 204 of the topic tree 208 subscribed to by the vehicle 31. The configuration update alert 306-O may include information such as the common from vehicle 31 information, the current status of the requested command (e.g., success, failure, in progress, etc.), and information regarding any errors that may have been encountered.

The firmware download status alert 306-P may be published by the VCS 1 upon condition that the vehicle 31 has downloaded or has failed to download firmware specified to the vehicle 31 by way of a firmware download command 302-K published by the service delivery network 200 to a topic 204 of the topic tree 208 subscribed to by the vehicle 31. The firmware download status alert 306-P may include information such as the common from vehicle 31 information, the current status of the requested command (e.g., success, failure, in progress, etc.), and information regarding any errors that may have been encountered.

The firmware reflash status alert 306-Q may be published by the VCS 1 upon condition that the vehicle 31 has successfully or unsuccessfully reflashed the VCS 1 with downloaded firmware. The firmware reflash status alert 306-Q may include information such as the common from vehicle 31 information, whether the reflash was successful, and information regarding any errors that may have been encountered if the reflash was unsuccessful.

The user authorization response alert 306-R may be published by the VCS 1 upon condition that the vehicle 31 has determined that the user has accepted or denied an initial or a final authorization request in the vehicle 31 (e.g., via an on-board user interface such as via a display screen or voice command). For example, the VCS 1 of the vehicle 31 may prompt the user for to accept terms of use of the VCS 1 for a number of key cycles (e.g., ten) until the user selects to agree or disagree. If the user selects to agree or disagree (or makes no selection within the number of key cycle retries which would default to disagree), a user authorization response alert 306-R may be published by the vehicle 31. The user authorization response alert 306-R may include information such as the common from vehicle 31 information, the common vehicle 31 status information, and an indication of whether authorization was allowed or denied.

The provisioning alert 306-S may be published by the VCS 1 upon condition that the vehicle 31 has determined that the VIN available on the CAN does not match the VIN stored in non-volatile storage of the VCS 1. For example, upon key-on the VCS 1 may compare the CAN VIN to the stored VIN, and if the vehicle 31 is not in factory mode and there is a difference between the CAN VIN and the stored VIN, the VCS 1 may store the new VIN, reset all user settings to default values, publish a provisioning alert 306-S to the message broker 202, and set the vehicle 31 authorization status to waiting for provisioning. The provisioning alert 306-S may include information such as the common from vehicle 31 information, the common vehicle 31 status information, and the current provisioning data as discussed above with respect to the provisioning data request command 302-L.

The sleep state change alert 306-T may be published by the VCS 1 to allow the message broker 202 and service delivery network 200 to maintain information regarding the sleep state of the vehicle 31. The sleep state change alerts 306-T may be published by the vehicle 31 when certain power moding transitions are performed by the vehicle 31 (e.g., entering high rate power state, entering low rate power state, entering deep sleep power state, waking up from deep sleep, etc.) The sleep state change alert 306-T may include information such as the common from vehicle 31 information, the common vehicle 31 status information, and the power state of the vehicle 31 (e.g., "high rate", "low rate", "deep sleep", "awake", etc.).

Figure 6:
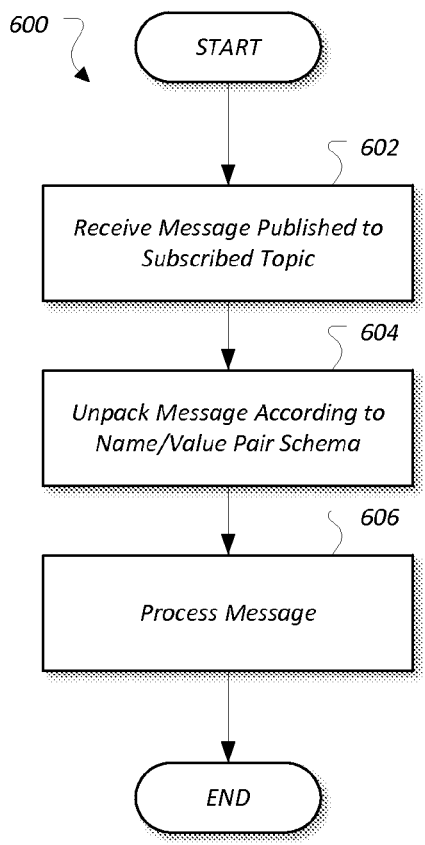
FIG. 6 illustrates an exemplary process for receiving a message.

FIG. 6 illustrates an exemplary process 600 for receiving a message 206. The process 600 may be performed, for example, by a subscriber to topics 204 of a topic tree 208, such as a service delivery network 200 or vehicle 31 in communication over a network 61 via a message broker 202.

At block 602, the recipient of the message 206 receives a message 206 published to a subscribed topic 204 of the topic tree 208. For example, in the publish/subscribe model, a topic tree 208 structure may be utilized by the service delivery network 200 to define a structure of the topics 204 and subtopics 204 that are used in sending messages 206 between the vehicles 31 and the service delivery network 200. For example, the VCS 1 may subscribe to topic 204 nodes of the topic tree 208 that correspond to the installed software/firmware version of the vehicle 31 and to the specific vehicle identifier (e.g., VIN) of the vehicle 31. In some cases, a vehicle 31 may be a publisher and the service delivery network 200 may be acting as the recipient of the message 206. For instance, the vehicle 31 and may send vehicle 31 alerts 306 to a service delivery network 200, responses 304 to commands 302 received from the service delivery network 200, or notify the service delivery network 200 of vehicle connectivity status. In other cases, a vehicle 31 may be a subscriber and may receive command 302 messages such as software update requests from the service delivery network 200.

At block 604, the recipient of the message 206 unpacks the message 206 according to a name/value pair schema. For example, the payload protocol utilized by the messages 206 may include a name/value pair model for the organization and serialization of the data structures being transported. The name/value pair model may allow for data elements of the messages 206 to be defined that vary according to the message 206 being sent. Additionally, the name/value pair model may allow for subsets of data to be defined (e.g., information to include in messages 206 from vehicles 31, information to be included in messages 206 from the service delivery network 200, information describing the status of the vehicle 31, information describing a current location of a vehicle, etc.) which may then be reused in multiple message 206 definitions without being redefined each time. Moreover, by use of the name/value pair model for data transmission, the system may allow for the addition of data elements to the message 206 definition without undesirably affecting deployed vehicles 31 that implement communication with the service delivery network 200 utilizing a previous version of the message 206 definition. Rather, as the data elements are addressed by identifier and not by bit location in the message 206, updated frameworks may be utilized without affecting existing deployed applications or vehicles 31 compiled against a previous version of the framework.

At block 606, the recipient of the message 206 processes the message 206. For example, the vehicle 31 or service delivery network 200 receiving the message 206 (e.g., a command 302, a command response 304, an alert 306) in any or the ways discussed in detail above with respect to those messages 206. After block 606, the process 600 ends.

Figure 7:
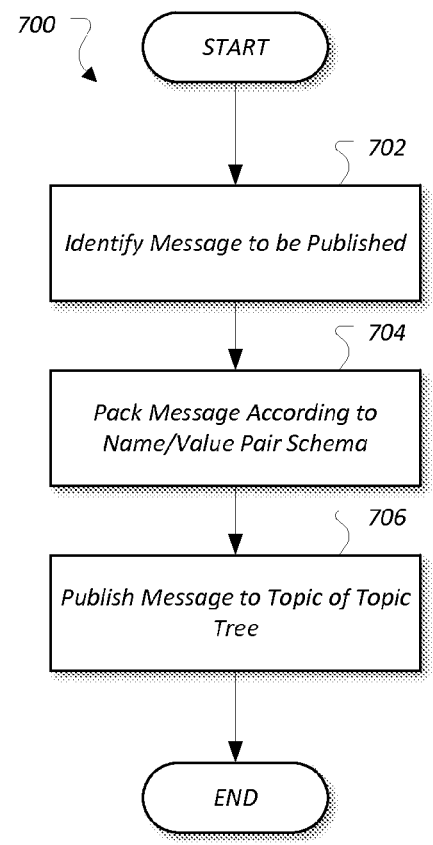
FIG. 7 illustrates an exemplary process for publishing a message.

FIG. 7 illustrates an exemplary process 700 for publishing a message 206. As with the process 600, the process 700 may be performed, for example, by a subscriber to topics 204 of a topic tree 208, such as a service delivery network 200 or vehicle 31 in communication over a network 61 via a message broker 202.

At block 702, the publisher of the message 206 determines that a message 206 should be published to a topic 204. For example, a vehicle 31 operating as published of the message 206 may determine that one or more alerts 306 should be provided to the service delivery network 200, e.g., based on the conditions discussed above. As another example, the vehicle may determine that a command response 304 should be provided to the service delivery network 200 responsive to a received command 302. As a further example, the service delivery network 200 operating as publisher may determine that one or more commands 302 should be provided to the vehicle 31, e.g., based on the conditions discussed above.

At block 704, the publisher of the message 206 packs the message 206 according to a name/value pair schema. For example, a vehicle 31 operating as published of the message 206 may include information in the message 206 (e.g., response 304, alert 306, etc.) according to information collected by the vehicle 31 via the CAN or via vehicle 31 sensors. As another example, the service delivery network 200 operating as publisher of the message 206 may collect information from various sources available to the service delivery network 200 to populate the message 206 (e.g., command 302) to be sent. The information to include may be added to the message 206 according to a name/value pair schema defined by the message 206 framework, such that the element values of information are packed into the message 206 according to their corresponding name identifier, not according to their bitwise location within the message 206.

At block 706, the publisher of the message 206 publishes the message 206 to the appropriate topic 204 of the topic tree 208. For example, the service delivery network 200 operating as publisher of the message 206 intending to send the message 206 to a particular vehicle 31 may publish the message 206 a topic 204 of the topic tree 208 subscribed to by that particular vehicle 31 (e.g., a topic node 404). As another example, the service delivery network 200 operating as publisher of the message 206 intending to send the message 206 to vehicles 31 at a particular firmware version may publish the message 206 a topic 204 of the topic tree 208 subscribed to by that particular subset of vehicles 31 (e.g., a topic node 410). As a further example, a vehicle 31 providing an alert 306 to the service delivery network 200 may publish the message 206 to an alert topic node 406-A (or 406-B for connection status alerts 306-N) associated with the vehicle 31. As yet a further example, a vehicle 31 providing command response 304 to the service delivery network 200 may publish the message 206 to a command response topic node 406-C associated with the vehicle 31. After block 706, the process 700 ends.

Thus, by using the publish/subscribe model and the name/value pair model in combination for vehicle 31 to service delivery network 200 communication, a protocol may be utilized that may offer a flexible and robust connectivity strategy for vehicle 31 communications. While these techniques are described herein with respect to vehicles-to-cloud communications, use of these models in combination may similarly be applicable to the vehicle-to-vehicle communication context. For example, rather than communicating published messages 206 between a vehicle 31 and the service delivery network 200, messages 206 may be published by vehicles 31 to topics subscribed to by other vehicles 31, without requiring use of the service delivery network 200.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
    a message publisher computing device configured to
        identify a message to be published to a topic of a topic tree maintained by a message broker, the topic corresponding to vehicles having at least one of a particular firmware version or a particular firmware configuration version and being associated with a type of the message identified to be published to an intended recipient of the message, the intended recipient of the message being at least one computing device subscribed to the topic;
        pack data elements into the message according to a name/value pair message schema of the system; and
        publish the message via the message broker to the topic.

2. The system of claim 1, wherein the message publisher computing device is a computing device of a service delivery network.

3. The system of claim 1, wherein the intended recipient of the message includes a plurality of vehicles subscribed to the topic of the topic tree.

4. The system of claim 1, wherein the intended recipient of the message is a single vehicle, and the topic is associated with a unique identifier of the single vehicle targeted to receive the message.

5. The system of claim 1, wherein the message publisher computing device is a vehicle, and the intended recipient of the message is a service delivery network.

6. The system of claim 5, wherein the message is a response to a command published to the vehicle by the service delivery network, and the message includes a correlation identifier specified by the command to allow the service delivery network to link the response to the command.

7. The system of claim 5, wherein the message is an alert published in response to a condition identified by the vehicle.

8. The system of claim 5, wherein the message is a connection alert published by the vehicle to inform the message broker that the vehicle is still connected to the message broker.

9. The system of claim 1, wherein each of the data elements is associated with a unique identifier, and to pack the data elements into the message includes to pack the unique identifier of each data element into the message accompanying a value for the respective data element.

10. A system comprising,
    a name/value pair message schema that defines at least one message structure defining a plurality of common data elements to be included in a plurality of types of message, the at least one message structure including at least one of: a set of common data elements to be included in messages from a vehicle to a service delivery network, and a set of common data elements to be included in messages from the service delivery network to the vehicle; and
    a message publisher computing device configured to
        identify a message to be published to a topic of a topic tree maintained by a message broker, the topic being associated with one of the plurality of types of message and an intended recipient of the message,
        pack data elements into the message according to the name/value pair message schema; and
        publish the message via the message broker to the topic.

11. A system comprising:
    a message recipient computing device, subscribed to a topic of a topic tree maintained by a message broker, the topic corresponding to a message type and a vehicle firmware version or vehicle firmware configuration version, configured to
        identify a message published by a message publisher to the topic;
        unpack data elements from the message according to a name/value pair message schema; and
        process the message according to the message type.

12. The system of claim 11, wherein the message publisher is a computing device of a service delivery network, and the message recipient computing device is a computing device of a vehicle.

13. The system of claim 12, wherein the message recipient computing device is one of a plurality of vehicles subscribed to the topic of the topic tree.

14. The system of claim 12, wherein the message recipient computing device is a single vehicle, and the topic is associated with a unique identifier of the single vehicle targeted to receive the message.

15. The system of claim 11, wherein the message publisher is a computing device of a vehicle, and the message recipient computing device is a computing device of a service delivery network.

16. The system of claim 15, wherein the message is a response to a command published to the vehicle by the service delivery network, and the message includes a correlation identifier specified by the command to allow the service delivery network to link the response to the command.

17. The system of claim 15, wherein the message is an alert published in response to a condition identified by the vehicle.

18. The system of claim 15, wherein the message is a connection alert published by the vehicle to inform the message broker that the vehicle is still connected to the message broker.

19. The system of claim 11, wherein each of the data elements is associated with a unique identifier, and to pack the data elements into the message includes to pack the unique identifier of each data element into the message accompanying a value for the respective data element.

20. A system comprising:
    a name/value pair message schema defines at least one message structure defining a plurality of common data elements to be included in a plurality of types of message, the at least one message structure including at least one of: a set of common data elements to be included in messages from a vehicle to a service delivery network, and a set of common data elements to be included in messages from the service delivery network to the vehicle; and
    a message recipient configured to
        identify a message published by a message publisher to a topic of a topic tree maintained by a message broker, the topic being associated with one of the plurality of types of message and subscribed to by the message recipient,
        unpack data elements from the message according to the name/value pair message schema; and
        process the message according to the type of the message.

* * * * *